Patented Apr. 29, 1941

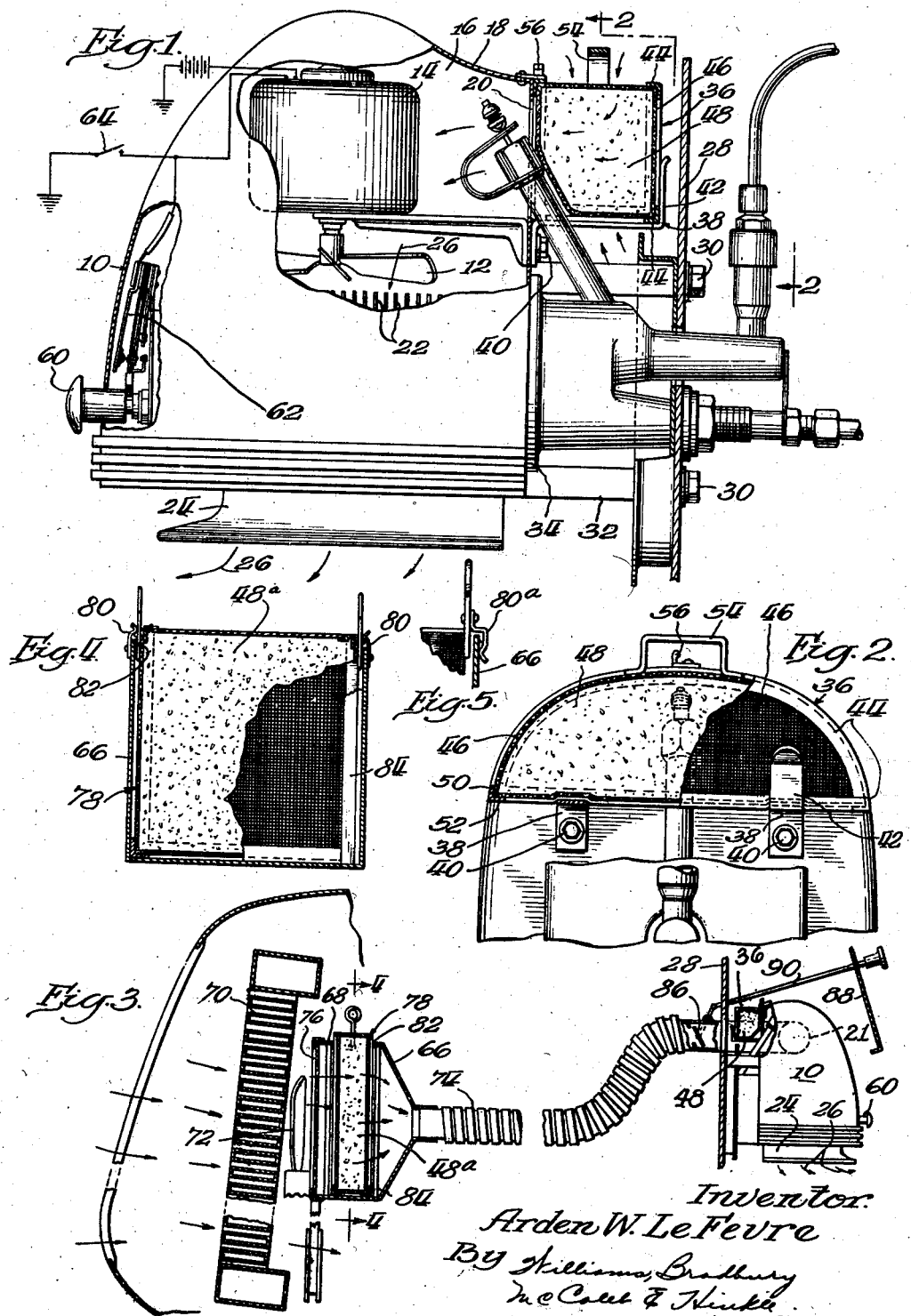

2,240,368

UNITED STATES PATENT OFFICE 2,240,368

AUTOMOBILE HEATER FILTER

Arden W. Le Fevre, Chicago, Ill., assignor to Stewart-Warner Corporation, Chicago, Ill., a corporation of Virginia Application September 26, 1938, Serial No. 231,765

3 Claims. (Cl. 183—49)

The present invention relates generally to automobile heater filter and the like and more particularly to devices of the class described which purify the air circulated and supplied by them to the passenger compartment of a motor vehicle.

One of the objects of the invention is to provide an improved heater unit for automobiles.

Another object of the invention is to provide a filter element for air entering a heater which may be readily replaced.

Another object of the invention is to provide an improved device of the class described wherein obnoxious and injurious fumes and gases are removed from the air which is heated and circulated in the passenger compartment of an automobile.

Another object of the invention is to provide an improved air conditioning system utilizing the fan motor of the heater all the year around for purifying the air circulated thereby in the passenger compartment of an automobile.

Another object of the invention is to provide filtering units for the air circulating system of an automobile passenger compartment which filters the replenishing air and the recirculated air independently of each other for circulation by the same circulating fan.

Another object of the invention is to provide a device of the class described wherein the amount of replenishing air supplied to the interior of a passenger compartment may be filtered and regulated in amount and mixed with filtered recirculated air for heating purposes.

Another object of the invention is to provide an air circulating system of the class described which is simple in construction and operation, effective in its use, and inexpensive to manufacture and maintain.

These being among the objects of the invention, other and further objects will become apparent from the drawing herein, the description relating thereto, and the appended claims.

Referring now to the drawing,

Fig. 1 is a side elevation partly in section of a heater illustrating a preferred embodiment of the invention wherein the filtering cartridge is shown in place;

Fig. 2 is a section taken upon the line 2—2 of Fig. 1;

Fig. 3 is a view similar to Fig. 1 showing a modification of the invention;

Fig. 4 is a section taken upon the line 4—4 of Fig. 3; and

Fig. 5 is a section of another form of the securing means employed to hold the filtering cartridge releasably in place.

Referring now to the embodiment of the invention shown in Figs. 1 and 2 of the drawing, the heater is indicated generally by the numeral 10 and reference may be had to the co-pending application of Henry J. De N. McCollum, Serial No. 61,213, filed January 28, 1936, for the structural characteristics thereof wherein, briefly, a fan 12 and motor 14 draw the air into the fan compartment 16 of the heater shell 18 through the intake opening 20. The air thus drawn in is forced through the radiator 22 in heat exchange relationship therewith and driven out into the interior of the passenger compartment, through the downwardly opening bell-shaped outlet 24 as indicated by the arrows 26.

The heater as shown in Fig. 1 is mounted upon the dash 28 by suitable bolts 30 and the back of the heater is held a spaced distance from the dash 28 by spacing sleeves 32 carried by the bolts 30 and located intermediate the main casting 34 of the heater 10 and the dash 28.

In the space provided between the casting and the dash, an air filtering cartridge 36 is removably mounted to cover completely the opening 20. The cartridge 36 is held in place by brackets 38 secured to the frame of the heater by bolts 40 immediately below the opening 20 and the outer ends 42 of the brackets are turned upwardly and flared outwardly so that the cartridge 36 may be slipped readily into place and removed for replacement when such is necessary.

The contour of at least one of the faces of the cartridge 36 follows the contour of the opening 20 in approximately sealed relationship therewith when in place, so that the opening 20 is entirely covered by one side of the cartridge with the other sides exposed to atmosphere inside of the passenger compartment. In this way any air drawn into the motor compartment and forced into the passenger compartment must pass through the cartridge 36 and be filtered of obnoxious odors, poisonous gases and other foreign matter.

The cartridge 36 is made of angle members 44 and fabricated screening 46, and is filled with activated carbon 48. The angle members 44 are formed and fashioned to define the shape of the cartridge with the included angle 50 of each member facing inwardly so that the sides 52 of the angle members provide marginal abutments locating the pieces of screening 46 in position, which are held in place against the angle members by the activated carbon packed inside the assemblage.

A handle 54 is secured to the cartridge 36 so that the cartridge may be easily managed when being inserted or removed from its position on the brackets 38, and a cam latch 56 is provided upon the shell 18 to clamp the cartridge 36 in place against any rattling or loosening that might permit air to be drawn past the edges of the cartridge without being filtered.

The activated carbon employed is a refined type of charcoal which absorbs condensible gases from the air passing through the cartridge and may have included with it granulated sodalime and potassium permanganate to react chemically with certain noxious gases liable to be present in the air under certain conditions and in different localities. While dense varieties of charcoal such as those derived from fibrous shells and fruit pits may be employed because of a greater efficiency, I have found that a good grade of wood charcoal will suffice and can be changed without great expense at regular intervals, depending upon a passenger-per-mile average which the owner of the vehicle can determine for himself.

The fan motor as shown in said co-pending application is controlled for operation by the handle 60 which opens a valve (not shown) in the radiator 22 to start the flow of hot gases of combustion through the radiator and the heat thereof closes a thermostat switch 62 to start the motor 14. In addition to this simultaneous control of the heat combustion and the motor an additional switch control 64 is provided in the invention whereby the motor 14 can be turned on separately and independently of the handle control 60. In such instances it is possible to run the motor at any time whether or not heat is being produced in the radiator so that the motor may serve as a circulating and air purifying medium in summer time as well as in winter time.

Referring to Figs. 3 and 4, another embodiment of the invention is illustrated wherein fresh air may be supplied to the passenger compartment with, or instead of recirculated air through the openings 20 and 21 in the shell 18. A bell-shaped member 66 is provided whose mouth 68 opens immediately behind the radiator 70 in the cooling system of the automobile. The mouth 68 is disposed so as to be in the path of the thrust of the cooling fan 72 so that air may be driven into the mouth 68 and forced under pressure through the flexible conduit 74 into the fan compartment from whence it is driven by the heater fan 12 into the passenger compartment.

In this particular embodiment a dust filter screen 76 is placed over the mouth 68 to remove heavy particles from the air and a filter cartridge 78 is inserted in the path of air leaving the dirt filter screen 76 to remove noxious gases and other condensible substances from the air in order to purify it. Snaps 80 and 80a as shown in Figs. 4 and 5 are employed to hold the cartridge 78 in place against inadvertent dislodgement or removal.

The cartridge 78 is inserted into place through an opening 82 provided in the top of the bell-shaped member 66 between vertical guides 84 therein which receive and support the cartridge 78 in place. The cartridge conforms in shape to the cross-sectional contour of the member 66 in which it is placed, and while constructed preferably in a manner like the cartridge 36 in Fig. 1, it may also be constructed of a gauze sack filled with the filtering media and slipped in place between two screens forming a part of the guide assembly in the member 66 instead of the cartridge.

The fresh air conduit 74 is provided with a butterfly valve 86 operated manually from the instrument panel 88 by a Bowden or flexible control wire 90 so that the amount of fresh air furnished the heater may be varied according to the desires of the occupants of the automobile. In this embodiment it will be appreciated that the fresh air supply can either be the sole supply of air entering the motor compartment, if desired, or supplemental to the recirculated air so that the fan compartment 16 may be supplied with both filtered fresh air and filtered recirculated air. The filter cartridge 36 shown in Fig. 3 is substantially identical in construction and location with that described in connection with the preferred embodiment depicted in Figs. 1 and 2.

In instances where the fan compartment is supplied with air from both filters, the filter media in each filter may have different properties so that the one 48 used with the recirculated air may be adapted for use to eliminate impurities prevalent in recirculated air, while the filter media 48a used with the fresh air supply may be designed for use to eliminate such obnoxious and harmful gases as are found to exist upon the road or in any particular locality.

With the fresh air entering the fan compartment 16 under pressure and the recirculated air entering the compartment under suction, it is evident that the fresh air supply is able to dominate the recirculated supply of air when the butterfly valve 86 is open. Consequently, regulation of the butterfly valve in the fresh air conduit provides for any degree of mixture of recirculated and fresh air supplied to the passenger compartment.

In this way I have provided an improved heater construction which filters the air supplied to the occupants of a passenger compartment and may be selectively controlled to supply any degree of recirculated or fresh air. Moreover, the two supplies of air may be filtered separately if desired and provided with filtering units to take care of the obnoxious and poisonous conditions prevalent in each of the air supplies, or each may serve without the other to provide sufficient and properly filtered air to the passenger compartment in winter and also in summer.

Consequently, although several embodiments of the invention have been shown and described in the accompanying drawing, it is apparent to those skilled in the art that various other and further uses, modifications and changes may be made in the constructions as shown without departing from the spirit and substance of the invention, the scope of which is commensurate with the appended claims.

What is claimed is:

1. An air purifying cartridge for a forced circulation automobile heater or the like having a shell defining a compartment, with an intake opening comprising a metal frame following the sectional contour of said shell at said opening, said cartridge being exposed to the ingress of air on all but one of its surfaces, permeable fabricated members supported by said frame and forming the sides of said cartridge, activated carbon in said container holding said members in place, and means for handling said cartridge for installing and removing it.

2. An air purifying cartridge for a forced circulation automobile heater or the like having a shell defining a compartment with an intake opening comprising a metal frame of angle members following the sectional contour of said shell adjacent said opening and disposed with their included angles facing inwardly, permeable members disposed against said angle members and forming the sides of said cartridge, said cartridge being exposed to the ingress of air on all but one of its surfaces, activated carbon filling said cartridge, and clamp means cooperative with said shell for holding said cartridge in place against inadvertent dislodgement.

3. An air conditioning apparatus for motor vehicles having a shell defining a compartment, a heater in said compartment, a fan for causing circulation of air through said compartment, said shell having an air intake opening at the top of the rear wall thereof and an air outlet at the bottom of said rear wall, a filter cartridge mounted to cover said intake opening and conforming to the shape thereof, said cartridge being exposed to the ingress of air on all of its surfaces except the surface covering said opening, brackets on the back of said shell for removably supporting said cartridge over said intake opening, and a latch on said shell for securely holding the cartridge on the brackets and in sealing relation with the air intake opening of said heater.

ARDEN W. LE FEVRE.